United States Patent [19]
Hoeptner, III

[11] Patent Number: 4,955,193
[45] Date of Patent: Sep. 11, 1990

[54] ADJUSTABLE SHIELD FOR MOTORCYCLE EXHAUST PIPE

[75] Inventor: Herbert W. Hoeptner, III, Morgan Hill, Calif.

[73] Assignee: Custom Chrome, Inc., Morgan Hill, Calif.

[21] Appl. No.: 380,535

[22] Filed: Jul. 17, 1989

[51] Int. Cl.⁵ .............................................. B60K 13/04
[52] U.S. Cl. ...................................... 60/320; 180/225; 180/309; 285/114
[58] Field of Search ....................... 180/309, 89.2, 225; 280/304.3, 304.4; 60/298, 299, 320; 285/45, 114, 184, 903

[56] References Cited

U.S. PATENT DOCUMENTS

| | | | |
|---|---|---|---|
| 3,237,716 | 3/1966 | Parsons | 180/89.2 X |
| 3,863,445 | 2/1975 | Heath | 180/309 X |
| 3,908,372 | 9/1975 | Fowler et al. | 60/320 |
| 3,963,087 | 6/1976 | Grosseau | 180/309 |
| 4,085,816 | 4/1978 | Amagai et al. | 180/39.2 |
| 4,415,185 | 11/1983 | Vinciguerra et al. | 285/114 |
| 4,483,556 | 11/1984 | LiVolsi | 285/903 X |
| 4,683,917 | 8/1987 | Bartholomew | 285/903 X |

FOREIGN PATENT DOCUMENTS

| | | | |
|---|---|---|---|
| 2327949 | 12/1974 | Fed. Rep. of Germany | 60/320 |
| 2819371 | 11/1979 | Fed. Rep. of Germany | 180/309 |

OTHER PUBLICATIONS

1988 Custom Chrome Catalog, pp. 90, 101, 102 and 108.

*Primary Examiner*—Charles A. Marmor
*Assistant Examiner*—Brian L. Johnson
*Attorney, Agent, or Firm*—William W. Haefliger

[57] ABSTRACT

A motorcycle exhaust pipe heat shield structure comprising a series of telescopically interfitting semi-annular shield members defining a lengthwise elongated shield sized to fit over the outer side of the exhaust pipe; and a rod extending adjacent the members and connected thereto; the rod being bendable, accompanied by relative angular adjustment of the members, to conform to a bend or bends in the exhaust pipe; the shield being attachable to the exhaust pipe, to extend lengthwise thereof, and at the outer side thereof.

8 Claims, 1 Drawing Sheet

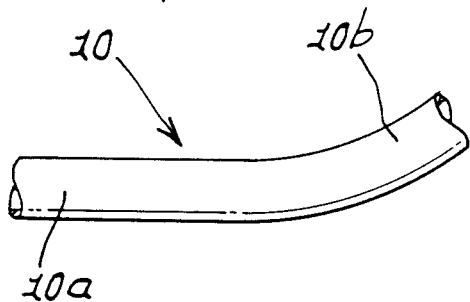
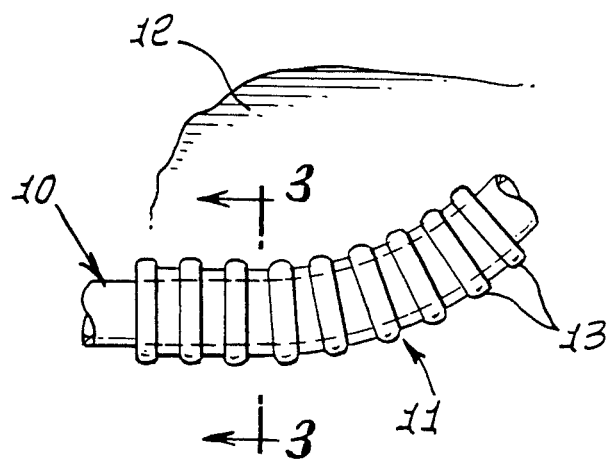
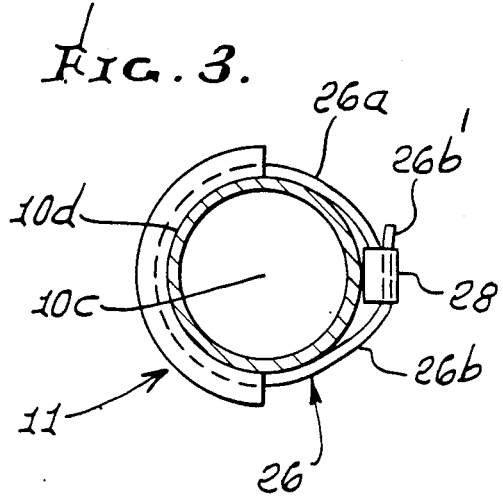
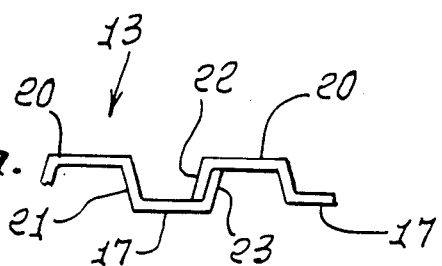
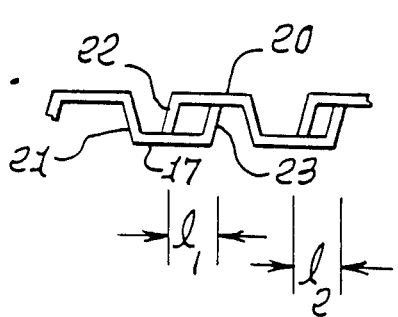

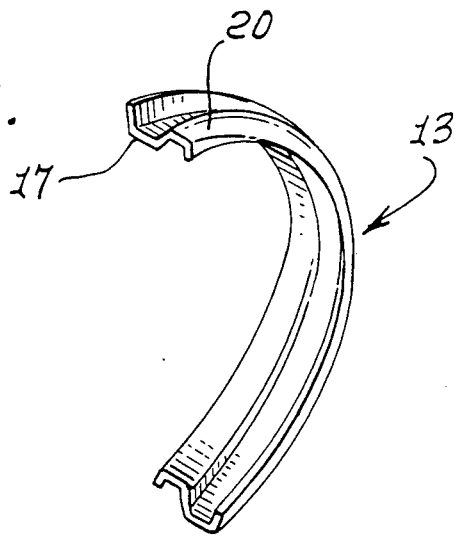
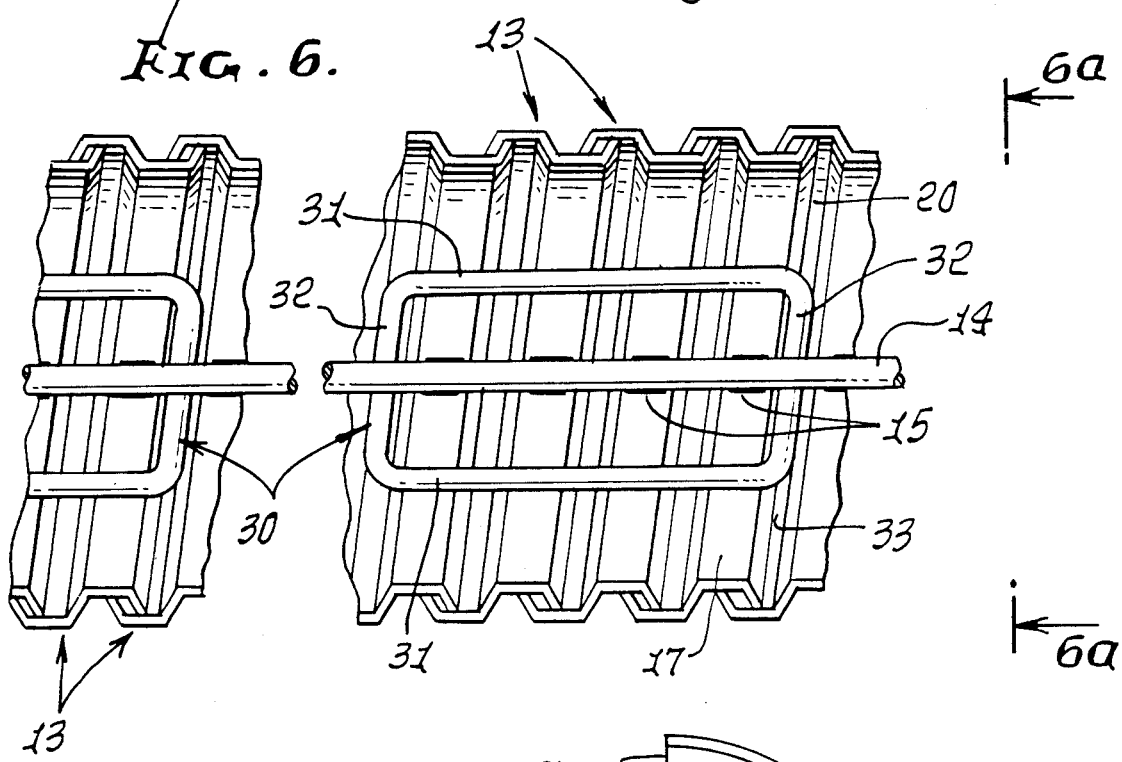
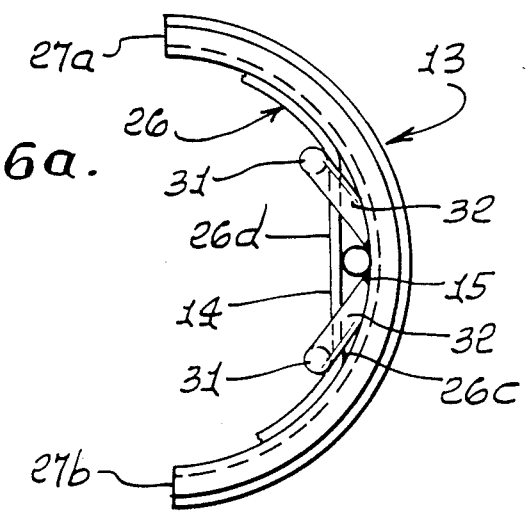

ADJUSTABLE SHIELD FOR MOTORCYCLE EXHAUST PIPE

BACKGROUND OF THE INVENTION

This invention relates generally to motorcycle exhaust pipe heat shielding, and more particularly, to a novel and unusual structure easily attachable to exhaust pipes of different configurations to shield heat radiation from such pipes.

The exhaust pipes of different motorcycles, and of different model motorcycles of the same make have different configurations. These often include turns and bends of different shapes. It is possible to construct rigid heat shields each to fit one particular exhaust pipe shape; however, this is an expensive procedure, and requires large inventories. There is need for an effective heat shield of one design which adapts or adjusts to different exhaust pipe shapes.

SUMMARY OF THE INVENTION

It is a major object of the invention to provide an improved heat shield that meets the above need. Basically, the motorcycle exhaust pipe heat shield structure of the invention comprises:

(a) a series of telescopically interfitting semi-annular shield members defining a lengthwise elongated shield sized to fit over the outer side of the exhaust pipe, (b) and a rod extending adjacent the members and connected thereto, (c) the rod being bendable accompanied by relative angular adjustment of the members, to conform to a bend or bends in the exhaust pipe, (d) the shield being attachable to the exhaust pipe, to extend lengthwise thereof, and at the outer side thereof.

As will be seen, the members typically have semi-annularly extending, interfitting beads that allow for relative displacement of the shield members, angularly, to produce a bend or bends in the shield structure to conform to a bend in an exhaust pipe.

The rod is rigidly attached to a plurality the members, and typically to all of the members. The latter may have inwardly and outwardly projecting beads, and the rod is then rigidly attached to inwardly projecting beads, at the inner sides of the semi-annular members. A holder is retained by the rod for entraining a strap attached to an exhaust pipe.

These and other objects and advantages of the invention, as well as the details of an illustrative embodiment, will be more fully understood from the following specification and drawings, in which:

BRIEF DRAWING DESCRIPTION

FIG. 1 is a side view of a exhaust pipe;

FIG. 2 is a side view of the heat shield of the invention attached to the FIG. 1 exhaust pipe;

FIG. 3 is a section taken on line 3—3 of a FIG. 2;

FIG. 4a is an enlarged fragmentary section showing interfitting of elements or members making up the heat shield;

FIG. 4b is a view like 4a but showing relative displacement of the members;

FIG. 5 is a perspective view of one of the members;

FIG. 6 is a fragmentary side view directed toward the interior of the heat shield and showing a rod interconnecting the displaceable members; and FIG. 6a is a view on lines 6a—6a of FIG. 6.

DETAILED DESCRIPTION

FIG. 1 shows a motorcycle exhaust pipe 10 having a straight portion 10a and a bend 10b. It is typical of different motorcycle exhaust pipes having various bend configurations, most of which are different. Unless a way is provided to attach a single heat shield to all of such different pipes, it becomes necessary to provide one particular heat shield configuration for each pipe, which is expensive in terms of dies required, and variations in manufacturing, as well as an inventory for each particular shield.

Referring to FIG. 2, the improved heat shield 11 of the invention is shown attached to the exhaust pipe 10 to be spaced outwardly on the pipe and spaced from the motorcycle body behind the pipe. That body is indicated generally at 12.

The shield comprises a series of telescopically interfitting semi-annular shield members 13, which are alike, and which have modified S-shaped cross sections. These members interfit in such a way as to define the lengthwise elongated shield 11 which is adjustable to conform to different exhaust pipe configurations, i.e., bends for example, the shield sized to fit over the outer side of each such pipe. The members 13 will be understood as individually adjustable within limits imposed by their interfit with adjacent members, by virtue of their construction as will be described; and they are retained in adjusted position by a rod 14, better seen in FIG. 6, which extends adjacent the inner sides of the members 13 and is locally connected to certain or all of the members.

FIG. 6 shows the bendable rod 14 a attached for example by local welds 15 to inwardly projecting beads or undulations 17 of the members, the rod also extending closely proximate such undulations. The rod is typically metallic and may consist of low carbon steel; and the members themselves consist of steel, the outwardly projecting sides thereof, as seen in FIG. 2, being chrome plated, or otherwise plated or treated for attractive appearance. It should also be understood that the members 13 extend substantially semiannularly, as for example about 180°, about the axis 10c of the pipe, as is clear from FIG. 3. Thus, the shield protects the outward facing side of the pipe and intercepts heat radiated from the pipe whereby the motorcyclist's leg cannot touch the very hot exhaust pipe, and, at most, contacts the much cooler shield. Note that the inward and outward undulations of the members 13 provide heat radiating surface area much greater than that of the straight, non-undulating exhaust pipe, contributing to the much cooler temperature of the shield.

As shown in FIG. 4a, the members 13 in cross section have "S" shape, each with an inward undulation or bead 17 and outward undulation or bead 20, a middle segment 21 interconnecting 17 and 20, a first end segment 22, integral with 20 and which is inwardly turned; and a second end segment 23, integral with 17 and which is outwardly turned. Normally, segment 23 of one member interfits segment 22 of the next member, that is, such interfitting being located at the ends of the members as shown in FIG. 4a. The members extend in such relation that they may be relatively displaced as in forming a shield bend, whereby the segments 22 and 23 become relatively displaced as seen in FIG. 4b, and as indicated between lengths $l_1$ and $l_2$, this configuration being at the inner side of a bend. Again, the rod 14 holds the members in their relatively displaced positions as can be attained by manual grasping of the shield and forcibly bending it to permanently bend the rod as required to shape the shield to the bend of the exhaust pipe.

The shield may be retained to the pipe as for example by means of a retainer 26 wrapping about the pipe at the side thereof facing the motorcycle body 12. For example, the retainer may include strap sections 26a and 26b attached to the shield members. One strap section 26a may have a buckle-type holder 28 attached to its opposite end; and the other strap section 26b may have its free end 26b' passed through the buckle and tightened therein as by friction or otherwise to hold the semi-circular shield in close relation to the exhaust pipe surface, that surface indicated for example at 10d in FIG. 3.

A holder is provided to retain the strap at the inner sides of the members 13, thereby to retain the strap to the member. Of particular advantage is the V-shaped, looping holder 30 seen in FIGS. 6 and 6a, having parallel arms 31, and V-shaped arms 32 connected to opposite ends of arms 31. The V-shaped arms extend beneath the rod 14 in spaces 20a formed by outer undulations 20. Arms 31 extend adjacent the inward undulations 17, as shown. The strap 26 extends beneath arms 31 as at 26c and over the rod 14, as at 26d, as seen in FIG. 6a.

Referring again to FIG. 6, it will be noted that the rod is attached to the members 13 at approximately their mid portions, i.e., approximately midway between their terminals 27a and 27b. Thus, while the weld attachments 15 retain their lengthwise spacing relation to the members 13, the end extents of the "C"-shaped members 13 may be relatively shifted to maximum or minimum extents allowing bending, as required to conform to an exhaust pipe bend.

I claim:

1. Heat shield structure for a motorcycle exhaust pipe having an outer side, comprising:
    (a) a series of telescopically interfitting shield members defining a lengthwise axially elongated shield sized to fit over the outer side of the exhaust pipe, the members having a c-shape about said axis,
    (b) and a rod extending adjacent the members and connected thereto,
    (c) the rod being bendable, accompanied by relative angular adjustment of the members, to conform to a bend in the exhaust pipe, said members having mid-points and the rod located at approximately said mid-points of the members,
    (d) and means attached to the shield for attaching the shield to the exhaust pipe, to extend lengthwise thereof and at the outer side thereof, said means including a strap, and a holder retained by the rod, said member shaving inner sides and said rod is located at said inner sides of said members, the strap entrained by the holder,
    (e) the holder having a shallow V-shape relative to said axis, and extending in a loop, with arms entrained by the strap, said arms extending generally parallel to the rod.

2. The structure of claim 1 wherein the members have C-shaped interfitting beads.

3. The structure of claim 1 wherein the bendable rod is rigidly attached to a plurality of the members.

4. The structure of claim 1 wherein the bendable rod is rigidly attached to each of the members.

5. The structure of claim 2 wherein the members have inwardly and outwardly projecting beads, the rod rigidly connected to said inwardly projecting beads.

6. The structure of claim 2 wherein the rod is rigidly attached to the beads at approximately mid-points along their lengths.

7. The structure of claim 1 wherein the exhaust pipe to which the shield is attached is retained by said strap which extends around said exhaust pipe strap.

8. The structure of claim 5 including the exhaust pipe to which said shield is attached with the rod adjacent the pipe.

* * * * *